US008797442B2

(12) United States Patent
Lee

(10) Patent No.: US 8,797,442 B2
(45) Date of Patent: Aug. 5, 2014

(54) METHOD OF CONTROLLING DIGITAL PHOTOGRAPHING APPARATUS AND DIGITAL PHOTOGRAPHING APPARATUS

(75) Inventor: Jae-myung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 13/197,895

(22) Filed: Aug. 4, 2011

(65) Prior Publication Data

US 2012/0050601 A1   Mar. 1, 2012

(30) Foreign Application Priority Data

Aug. 26, 2010  (KR) .................. 10-2010-0083072

(51) Int. Cl.
 *H04N 5/222* (2006.01)
(52) U.S. Cl.
 USPC ............ 348/333.04; 348/333.01; 348/333.03

(58) Field of Classification Search
 USPC ........................... 348/333.01, 333.03, 333.04
 See application file for complete search history.

(56) References Cited

U.S. PATENT DOCUMENTS

| 7,295,240 B2 * | 11/2007 | Kobayashi et al. ...... 348/333.06 |
| 2003/0231254 A1 * | 12/2003 | Yoneyama et al. ...... 348/333.01 |
| 2009/0273667 A1 * | 11/2009 | Nozaki et al. ................... 348/77 |
| 2010/0296801 A1 * | 11/2010 | Lane ................. 396/2 |
| 2013/0300908 A1 * | 11/2013 | Ishii ........................ 348/333.02 |

* cited by examiner

*Primary Examiner* — Anthony J Daniels
(74) *Attorney, Agent, or Firm* — Drinker Biddle & Reath LLP

(57) ABSTRACT

A method of controlling a digital photographing apparatus, and a digital photographing apparatus, in which a child's face is registered in the digital photographing apparatus, and the child's interest is continuously attracted by using a preferred image and sound of the child. Thus, an inattentive child's interest may be attracted to a camera and thus the child may be photographed while the child is focusing on images displayed on the camera.

13 Claims, 7 Drawing Sheets

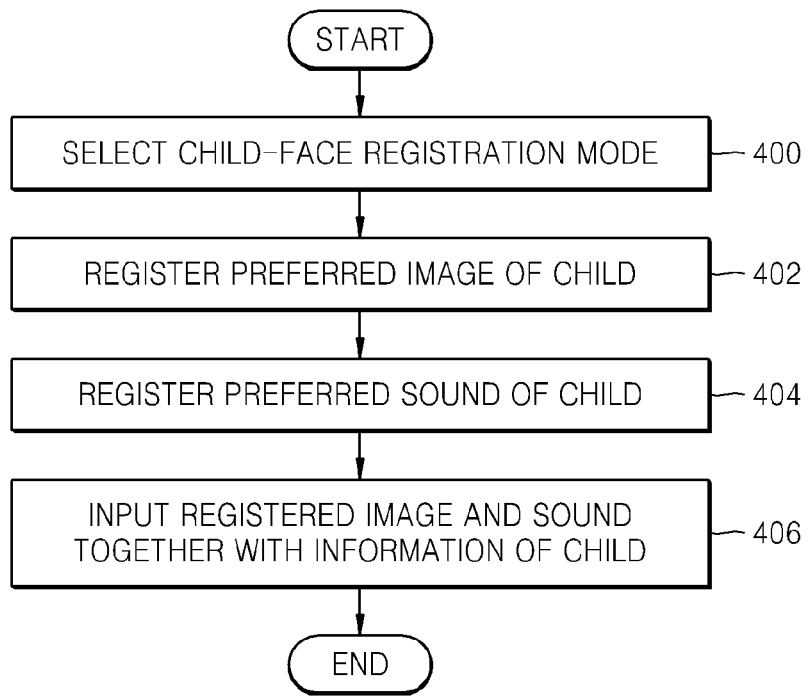
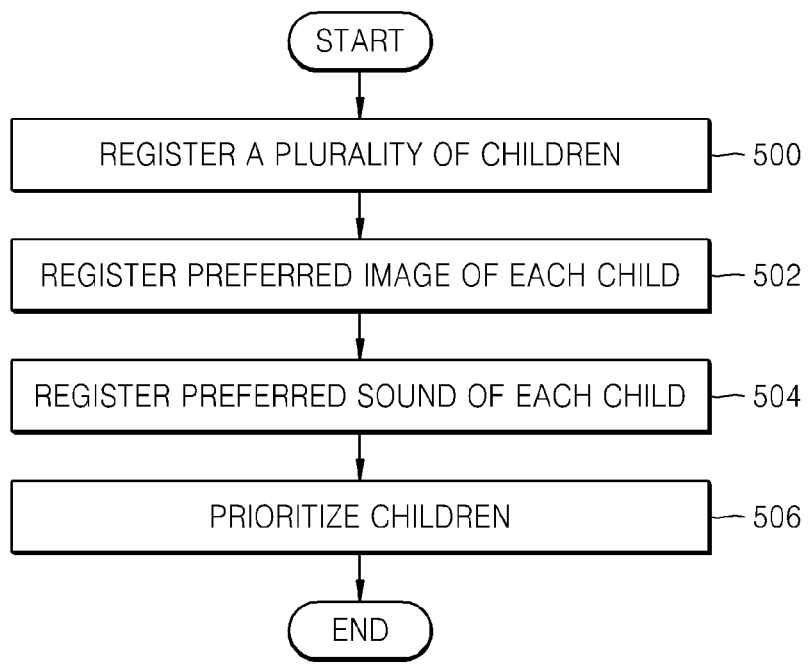

METHOD OF CONTROLLING DIGITAL PHOTOGRAPHING APPARATUS AND DIGITAL PHOTOGRAPHING APPARATUS

CROSS-REFERENCE TO RELATED PATENT APPLICATION

This application claims the priority benefit of Korean Patent Application No. 10-2010-0083072, filed on Aug. 26, 2010, in the Korean Intellectual Property Office, the disclosure of which is incorporated herein in its entirety by reference.

BACKGROUND

1. Field of the Invention

Embodiments relate to digital photographing apparatuses, and more particularly, to digital photographing apparatuses including a plurality of display units, and methods of controlling the digital photographing apparatuses.

2. Description of the Related Art

Dual-display digital photographing apparatuses, such as a digital camera and a digital camcorder, can display the same image on two display units. For example, dual-display digital photographing apparatuses can display the same live view image, preview image, play view image, or the like, on two display units.

A front display unit of a dual-display digital photographing apparatus may realize various applications since a subject can view the front display unit during photographing.

SUMMARY

Embodiments include a method of controlling a digital photographing apparatus, in which a child's face is registered in the digital photographing apparatus, and the child's interest is continuously attracted by using a preferred image and sound of the child.

According to an embodiment of a method of controlling a digital photographing apparatus including a first display unit and a second display unit, the method includes: detecting a subject that is previously registered, in an input image; and displaying a registered preferred image on the second display unit included in a front surface of the digital photographing apparatus according to information of the detected subject.

The method may further include outputting a registered preferred sound through a speaker of the digital photographing apparatus according to the information of the detected subject.

The method may further include registering a predetermined subject, and a preferred image and a preferred sound of the predetermined subject.

The registering may further include registering a priority of the predetermined subject.

The method may further include, when a plurality of subjects that are previously registered are detected in the input image, determining the priorities of the plurality of subjects, wherein the displaying may include displaying the registered preferred image on the second display unit included in the front surface of the display photographing apparatus according to information of the detected subject having highest priority.

The method may further include detecting a subject in the input image; and recognizing whether the detected subject is a registered subject.

The displaying may include, when the detected subject is not the registered subject, an image that is previously set is displayed on the second display unit.

The subject may be a child's face.

According to another embodiment, a digital photographing apparatus includes: a first display unit; a second display unit included in a front surface of the digital photographing apparatus; a subject recognizing unit that detects a subject that is previously registered, in an input image; and a control unit that displays a registered preferred image on the second display unit according to information of the detected subject.

The control unit may output a registered preferred sound through a speaker of the digital photographing apparatus according to the information of the detected subject.

The digital photographing apparatus may further include a subject registering unit that registers a predetermined subject, and a preferred image and a preferred sound of the predetermined subject.

The subject registering unit may register a priority of the predetermined subject.

The control unit, when a plurality of subjects that are previously registered are detected in the input image, may determine the priorities of the plurality of subjects, and may display the registered preferred image on the second display unit included in the front surface of the digital photographing apparatus according to information of the detected subject having highest priority.

The digital photographing apparatus may further include a subject detecting unit that detects a subject in the input image, where the subject recognizing unit may recognize whether the detected subject is a registered subject.

When the detected subject is not the registered subject, the control unit may display an image that is previously set on the second display unit.

The subject may be a child's face.

BRIEF DESCRIPTION OF THE DRAWINGS

The above and other features and advantages will become more apparent by describing in detail exemplary embodiments with reference to the attached drawings in which:

FIG. 4 is a flowchart of a method of registering a subject, according to an embodiment;

FIG. 5 is a flowchart of a method of registering a subject, according to another embodiment;

DETAILED DESCRIPTION

Exemplary embodiments will now be described more fully with reference to the accompanying drawings. Only techniques and structures necessary for understanding the embodiments will be described and other techniques or structures which may unnecessarily make the embodiments unclear will not be described.

The terms and words which are used in the present specification and the appended claims should not be construed as being confined to common meanings or dictionary meanings but should be construed as meanings and concepts matching the technical spirit of the present invention in order to describe the present invention in the best fashion.

Figure 1A:
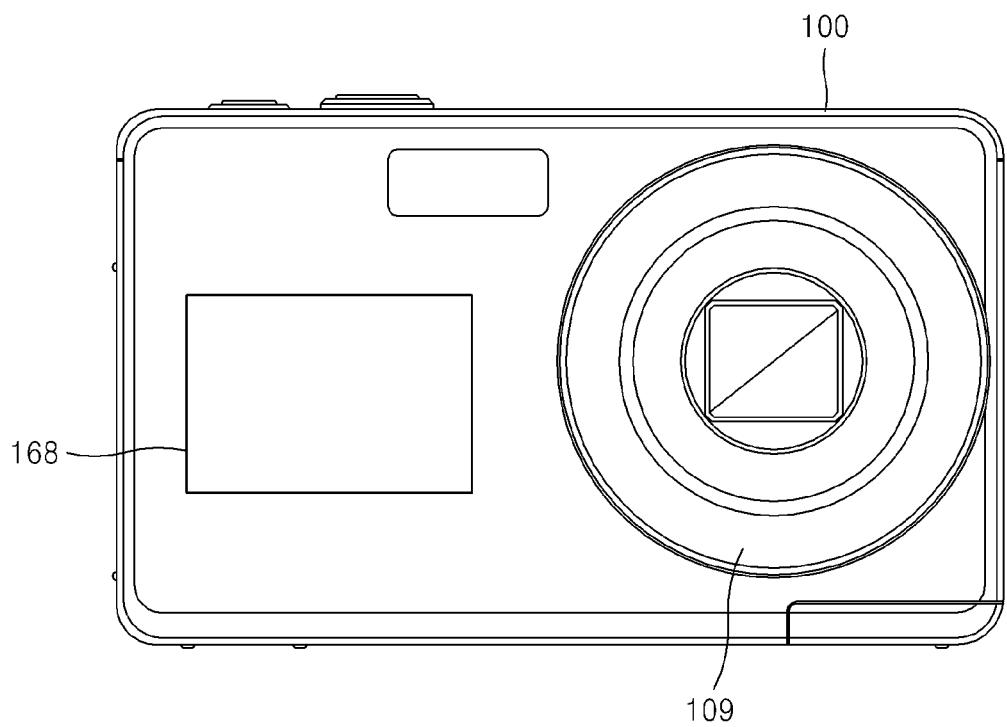
FIGS. 1A and 1B illustrate an outer appearance of a digital photographing apparatus, according to an embodiment.
Figure 1B:
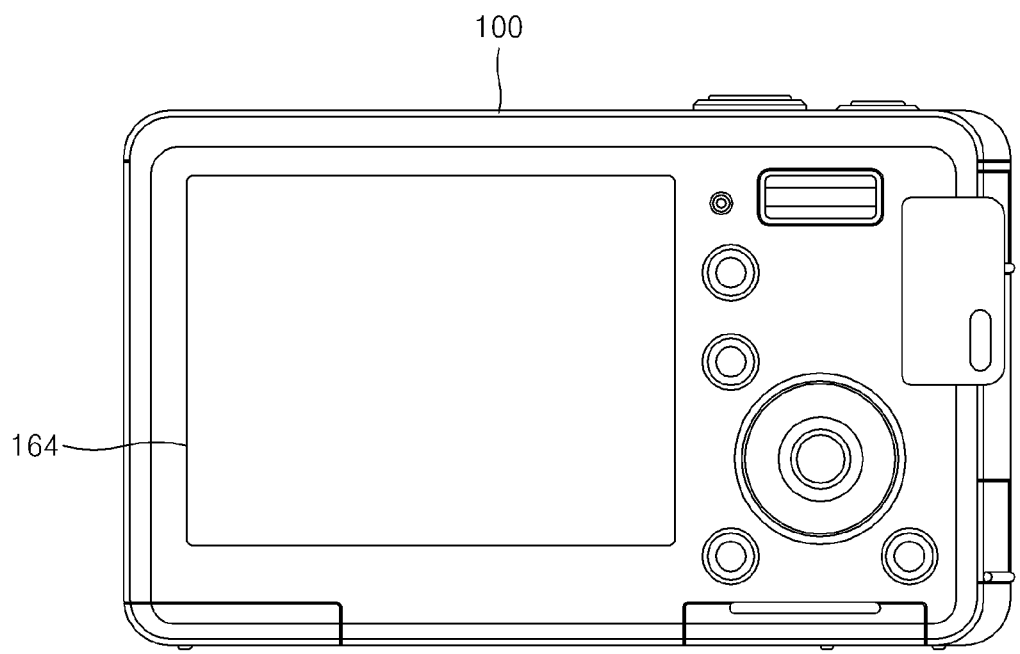

FIGS. 1A and 1B illustrate an outer appearance of a digital photographing apparatus 100, according to an embodiment. The digital photographing apparatus 100 may include a first display unit 164 disposed on a rear surface thereof, and a second display unit 168 disposed on a front surface thereof. Referring to FIG. 1A, the first display unit 164 may be disposed on a surface opposite to a surface on which a lens barrel 109 is disposed, and the second display unit 168 may be disposed on the surface on which the lens barrel 109 is disposed.

Figure 2:
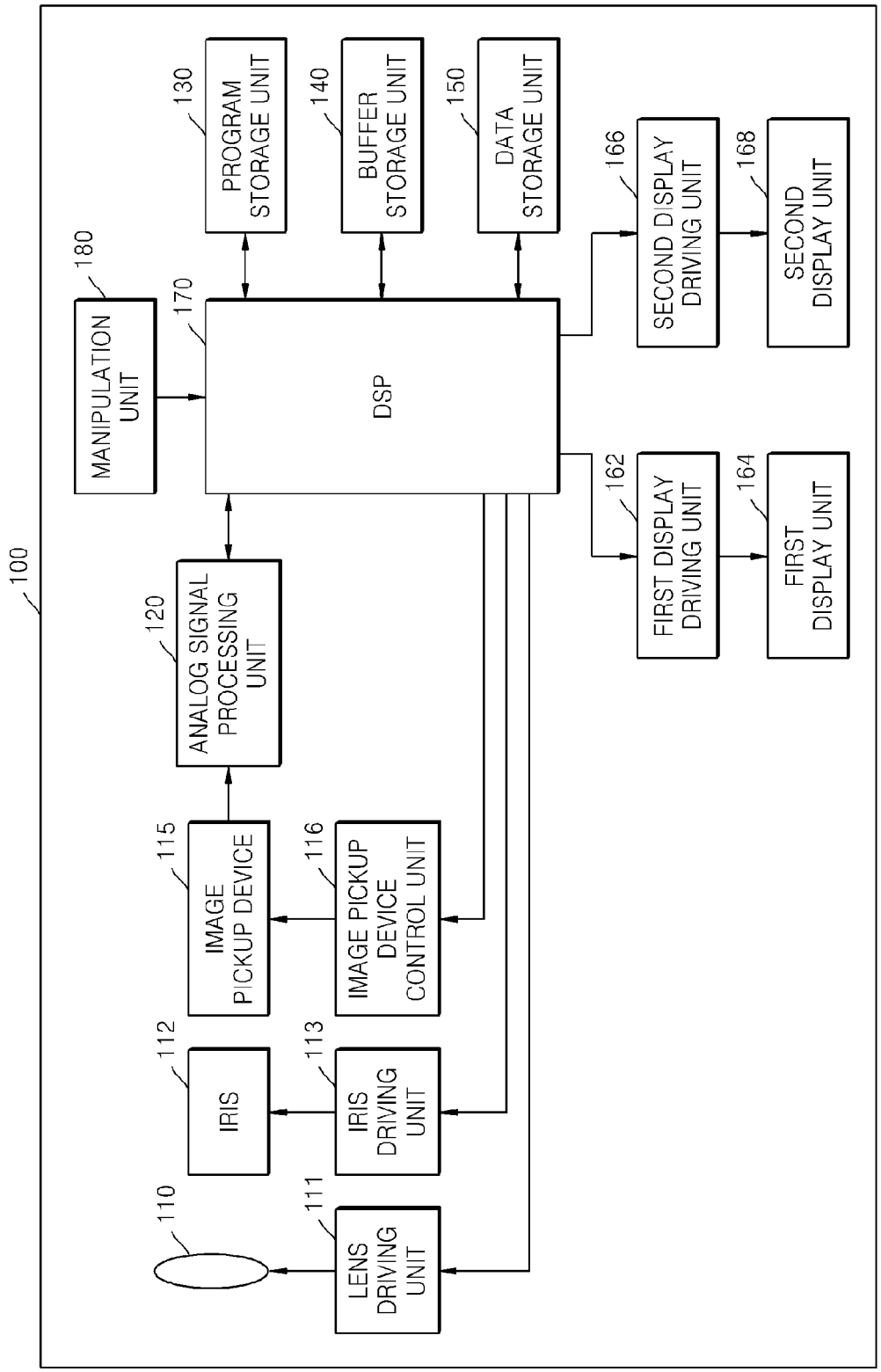
FIG. 2 is a block diagram of the digital photographing apparatus of FIG. 1, according to an embodiment.

FIG. 2 is a block diagram of the digital photographing apparatus 100 of FIG. 1, according to an embodiment.

Referring to FIG. 2, the digital photographing apparatus 100 may include a lens 110, a lens driving unit 111, an iris 112, an iris driving unit 113, an image pickup device 115, an image pickup device control unit 116, an analog signal processing unit 120, a program storage unit 130, a buffer storage unit 140, a data storage unit 150, a first display driving unit 162, the first display unit 164, a second display driving unit 166, the second display unit 168, a digital signal processing unit 170, and a manipulation unit 180.

The lens 110 obtains an optical signal. The lens 110 may include a zoom lens for widening or narrowing a viewing angle according to a focal length of the lens 110, and a focus lens for focusing on a subject. Each of the zoom lens and the focus lens may be formed as a single lens or a group of a plurality of lenses.

The iris 112 adjusts an amount of light incident on the image pickup device 115 according to an opening degree of the iris 112.

The lens driving unit 111 and the iris driving unit 113 receive control signals from the digital signal processing unit 170, and respectively drive the lens 110 and the iris 112. The lens driving unit 111 adjusts the focal length of the lens 110 by adjusting a position of the lens 110, and performs auto focusing, zoom changing, focus changing, and the like. The iris driving unit 113 adjusts the opening degree of the iris 112, and performs auto focusing, automatic exposure adjustment, focus changing, field depth adjustment, and the like by adjusting an F number.

The optical signal passing through the lens 110 reaches a light-receiving surface of the image pickup device 115 and forms an image of the subject. The image pickup device 115 may be a complementary metal oxide semiconductor image sensor (CIS) or a charge coupled device (CCD) to convert the optical signal into an electric signal. Sensitivity of the image pickup device 115 may be controlled by the image pickup device control unit 116. The image pickup device control unit 116 may control the image pickup device 115 according to a control signal that is manually input by a user's manipulation, or a control signal that is automatically generated in response to an image signal that is input in real time.

An exposure time of the image pickup device 115 is adjusted by using a shutter (not shown). The shutter may be a mechanical shutter for adjusting the amount of light incident on the image pickup device 115 by moving a lens shade up and down, or an electronic shutter for adjusting the amount of incident light by applying an electric signal to the image pickup device 115.

The analog signal processing unit 120 performs noise reduction, gain control, waveform shaping, analog-digital conversion, and the like on an analog signal applied from the image pickup device 115.

The digital photographing apparatus 100 includes the program storage unit 130 for storing programs of, for example, operating and application systems, the buffer storage unit 140 for temporarily storing data necessary for and result data of various operations, and the data storage unit 150 for storing various types of data necessary for the programs, for example, image files including image signals. The data storage unit 150 stores subject registration information regarding, for example, a subject, a preferred image of the subject, or a preferred sound of the subject. In this case, when a plurality of subjects are registered, the subject information is divided and stored, or alternatively, the subject information is divided, prioritized, and stored.

The digital photographing apparatus 100 includes the first display unit 164 and the second display unit 168 for displaying an operation state of the digital photographing apparatus 100 or image data captured by the digital photographing apparatus 100. The first display unit 164 and the second display unit 168 may provide visual information and/or audible information to the user. In order to provide visual information to the user, the first display unit 164 and the second display unit 168 may include a liquid crystal display (LCD) panel or an organic light-emitting display (OLED) panel. The first display driving unit 162 and the second display driving unit 166 respectively provide driving signals to the first display unit 164 and the second display unit 168. Although the first display driving unit 162 and the second display driving unit 166 separately drive the first display unit 164 and the second display unit 168 in FIG. 2, the present embodiment is not limited thereto and one display driving unit may drive both the first display unit 164 and the second display unit 168.

The digital photographing apparatus 100 includes the digital signal processing unit 170 for processing an input image signal and controlling each element of the digital photographing apparatus 100 according to the input image signal or an external input signal. The digital signal processing unit 170 may reduce noise in input image data, and perform image signal processing for image quality improvement, such as gamma correction, color filter array interpolation, color matrix, color correction, or color enhancement. The digital signal processing unit 170 may generate an image file by compressing image data that is generated by the image signal processing for image quality improvement, and may restore the image data from the image file. The image data may be reversibly or irreversibly compressed in a joint photographic experts group (JPEG) format or a JPEG2000 format. The image file may be stored in the data storage unit 150. The digital signal processing unit 170 may perform sharpening, color processing, blur processing, edge emphasis, image analysis, image recognition, image effect processing, and the like. The image recognition may include face recognition and scene recognition. Also, the digital signal processing unit 170 may perform image signal processing to display an image on the first display unit 164 and the second display unit 168. For example, the digital signal processing unit 170 may perform image synthesis such as brightness adjustment, color correction, contrast adjustment, outline emphasis, screen split, or character image generation. The digital signal processing unit 170 may perform image signal processing to display image data on an external monitor by being connected to the external monitor.

Also, the digital signal processing unit 170 may execute the programs stored in the program storage unit 130, generate a control signal for controlling auto focusing, zoom change, focus change, automatic exposure correction, and the like by using a separate module, provide the control signal to the lens driving unit 111, the iris driving unit 113, and the image pickup device control unit 116, and control operations of the elements included in the digital photographing apparatus 100 such as the shutter and a flash.

The manipulation unit 180 may include a member for the user to manipulate the digital photographing apparatus 100 or to manage various photographing settings. For example, the manipulation unit 180 may include buttons, keys, a touch panel, a touch screen, a dial, or the like. The manipulation unit 180 may input user manipulation signals such as power on/off signals, photographing start/stop signals, reproduction start/stop/search signals, a lens driving signal, a mode change signal, a menu manipulation signal, a selection manipulation signal, and the like. For example, a shutter button may be half-pressed, full-pressed, or released by the user. A focus control start manipulation signal is output when the shutter button is half-pressed (manipulation S1), and focus control is terminated when the half-pressed shutter button is released. A photographing start manipulation signal may be output when the shutter button is full-pressed (manipulation S2). A manipulation signal may be transmitted to the digital signal processing unit 170 to drive an element corresponding to the manipulation signal.

A subject is registered in the manipulation unit 180. For example, the subject may be found in an image stored in the digital photographing apparatus 100, and then may be registered in the manipulation unit 180, which may be a setting button, a touch screen, a trackball, or a stick. In detail, at least one point or a predetermined area of a subject of interest, for example, a child's face, is selected with the setting button, the touch screen, the trackball, or the stick. Then, a region including the child's face is extracted and stored based on the selected point or the selected area. Lastly, subject information is input. In this case, the subject information may be the child's name, a preferred image of the child, or a preferred sound of the child. When a plurality of children are registered, the subject information may contain information regarding priority.

Figure 3:
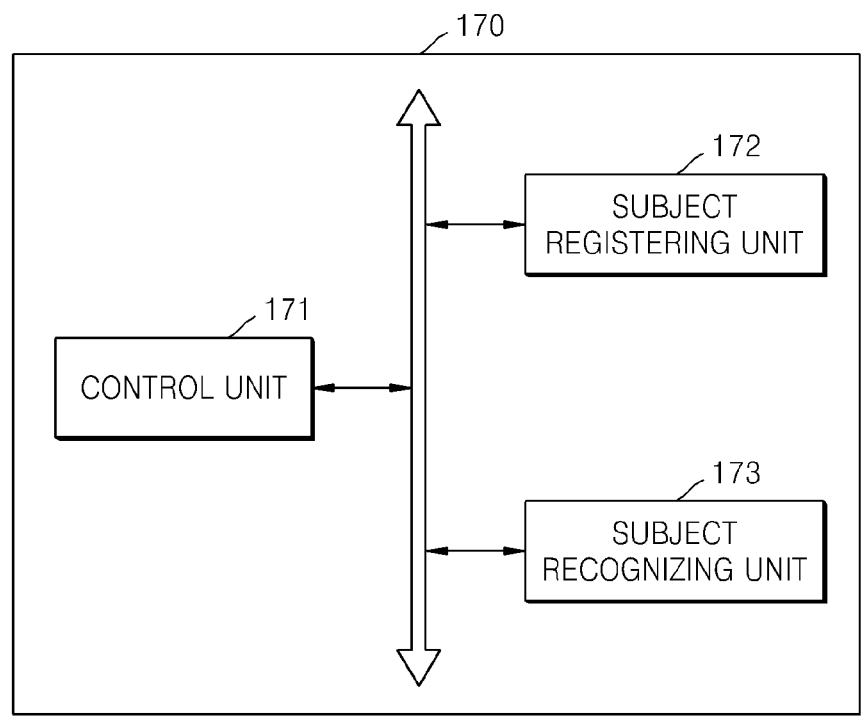
FIG. 3 is a block diagram of a digital signal processing unit illustrated in FIG. 2, according to an embodiment.

FIG. 3 is a block diagram of the digital signal processing unit 170 illustrated in FIG. 2, according to an embodiment.

Referring to FIG. 3, the digital signal processing unit 170 includes a control unit 171, a subject registering unit 172, and a subject recognizing unit 173. Although not illustrated in FIG. 3, the digital signal processing unit 170 may further include a subject detecting unit for detecting a subject in an input image. When the subject is a face, the subject detecting unit may be a face detecting module. In this case, the term 'digital photographing apparatus' that includes the above-described components and is used in the following claims has the same meaning as that of the digital signal processing unit 170.

The control unit 171 controls overall operations of the digital signal processing unit 170.

The subject registering unit 172 registers subject information. In this case, the subject information may include information regarding a subject's name, a preferred image of the subject, or a preferred sound of the subject, and may also include information regarding priority. A method of registering a subject has been described above.

The subject recognizing unit 173 recognizes a previously registered subject in an input image. The subject is recognized by comparing a feature of the subject with a feature of the input image, and determining whether the subject exists in the input image. The subject is recognized as follows. First, the feature of the input image and the feature of the subject are extracted, and similarity between extracted features is calculated. In this case, the features are extracted by dividing an entire portion of the input image into sub-images, and extracting descriptors for the respective sub-images. The descriptors may each be scale invariant feature transform (SIFT) or a color moment. In addition, the similarity may be calculated by using Euclidean distance, mutual information distance, or the like. Then, a greatest value of the calculated similarity is compared with a predetermined threshold value so as to determine whether the greatest value of the similarity is equal to or greater than the threshold value. In this case, the threshold value is a reference value for determining whether the registered subject exists in the input image. When the greatest value of the similarity is equal to or greater than the threshold value, it is determined that the registered subject exists in the input image.

When the registered subject is recognized in the input image, the control unit 171 displays a preferred image of the subject on the second display unit 168 according to subject information. In addition, together with the preferred image or individually, the preferred sound may be output through a speaker (not shown) according to the subject information.

When the control unit 171 detects a plurality of subjects in the input image, and a plurality of registered subjects are recognized from among the detected subjects, a priority of each of the registered subjects is determined, and a preferred image of the subject having the highest priority is displayed. For example, when three children's faces are detected in an input image, and all three children are registered, if a priority of a child 'A' is greatest among those of the three children, a preferred image of the child 'A' may be displayed.

In addition, when a detected subject is not recognized as a registered subject, the control unit 171 may display a predetermined image or a default image on the second display unit 168.

Methods of controlling a digital photographing apparatus according to an embodiment will be described with reference to FIGS. 4 through 7. So far, a case where a subject is a child's face has been described. However, the present embodiment is not limited to this case. For example, the method may be used when focus is required for a photographing operation, or when photographing an inattentive subject, for example, when photographing an animal.

FIG. 4 is a flowchart of a method of registering a subject, according to an embodiment.

Referring to FIG. 4, in operation 400, a child-face registration mode is selected. While viewing recorded children's faces in a reproduction mode of a digital photographing apparatus, a user selects the child-face registration mode, and selects a child's face using an input interface for selecting a child's face. In operation 402, a preferred image of the child is registered. For example, "a PORORO image", "a mother image", and "a father image" may be registered for children 'A', 'B', and 'C', respectively. In operation 404, a preferred sound of the child is registered. For example, "PORORO music", "a mother sound", and "a puppy sound" may be registered for children 'A', 'B', and 'C', respectively.

In operation 406, the registered image and sound are input together with information regarding the child. For example, a nickname or name, the PORORO image, and the PORORO music are registered for the child 'A', a nickname or name, the mother image, and the mother sound are registered for the child 'B', and a nickname or name, the father image, and the puppy sound are registered for the child 'C'.

FIG. 5 is a flowchart of a method of registering a subject, according to another embodiment.

Referring to FIG. 5, in operation 500, a plurality of children's faces are registered. As described with reference to FIG. 4, in operations 502 and 504, preferred images and sounds of the children are registered.

In operation 506, the children are prioritized. For example, the children 'A', 'B', and 'C' may be prioritized and registered having priorities 1, 3, and 2, respectively. Then, in a child photographing mode, when all of the children 'A', 'B', and 'C' are detected in an input image, a preferred image of the child 'A' is displayed or a preferred sound of the child 'A' is output, according to the priority.

Figure 6:
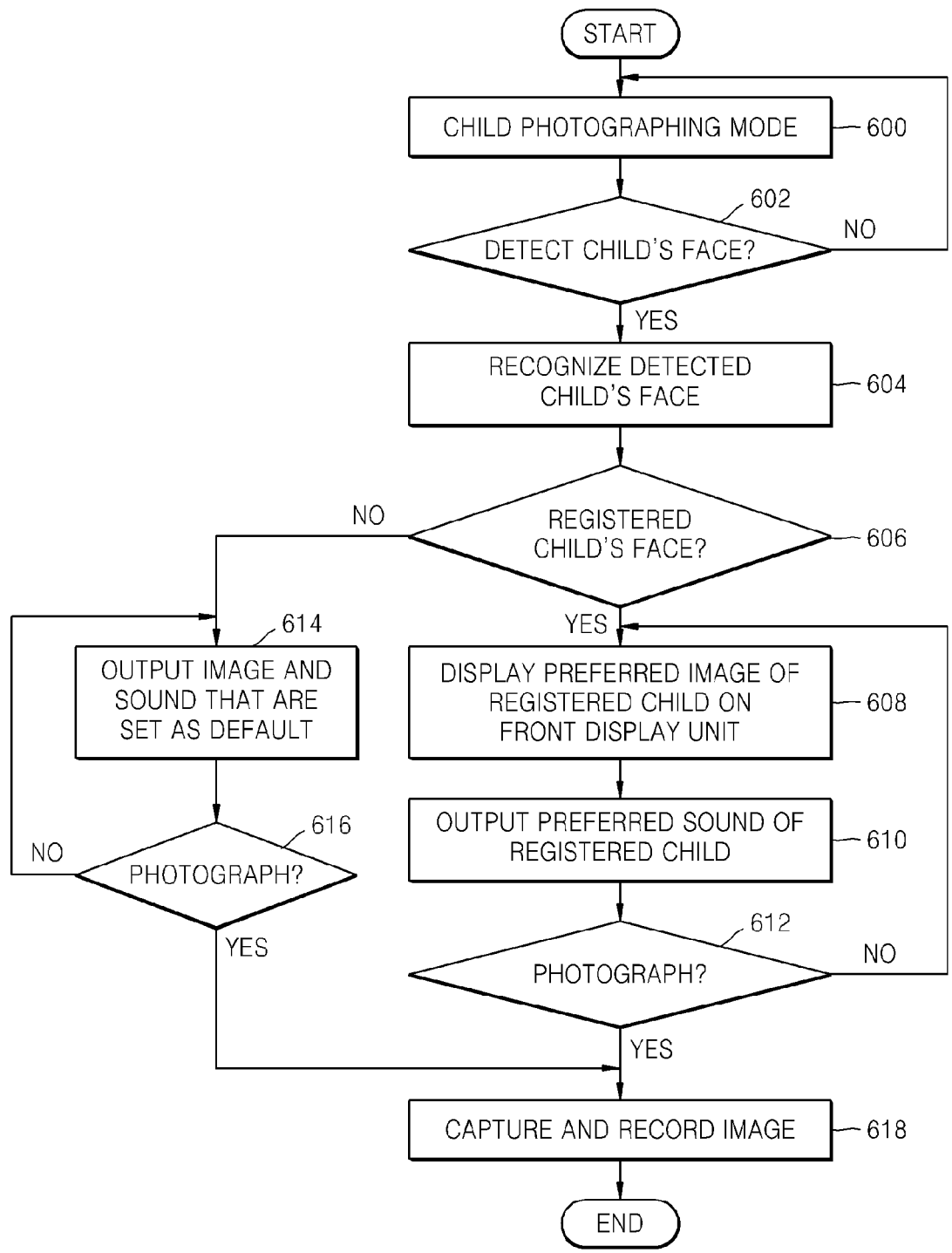
FIG. 6 is a flowchart of a method of controlling a digital photographing apparatus, according to an embodiment.

FIG. 6 is a flowchart of a method of controlling a digital photographing apparatus, according to an embodiment.

Referring to FIG. 6, in operation 600, the child photographing mode is selected. In operation 602, a child's face is detected in an input image. In operation 604, whether the detected child's face is a registered child's face is recognized. In operation 606, when the detected child's face is determined to be the registered child's face, the method proceeds to operations 608 and 610, in which a preferred image of the registered child may be displayed on a front display unit, and a preferred sound of the registered child may be output. In this case, both the image and sound are output, but the present embodiment is not limited thereto. Alternatively, any one of the image and the sound may be output.

In operation 612, when the child is interested in the output image and sound of operations 608 and 610, and a release button is full-pressed (S2), an image is captured and recorded, in operation 618. When the release button is not full-pressed (S2), the method returns to operation 608, and operations 608 and 610 are again performed so as to continuously attract the child's interest.

In operation 606, when the detected child's face is not a registered child's face, default image and sound are output, in operation 614. Then, when the method proceeds to operation 616, and the release button is full-pressed (S2), the image is captured and recorded. So far, a case where a predetermined image and sound are output when the detected child's face is not the registered child's face has been described, but the present embodiment is not limited to this case. Alternatively, a photographing operation may be performed without outputting any image and sound.

Figure 7:
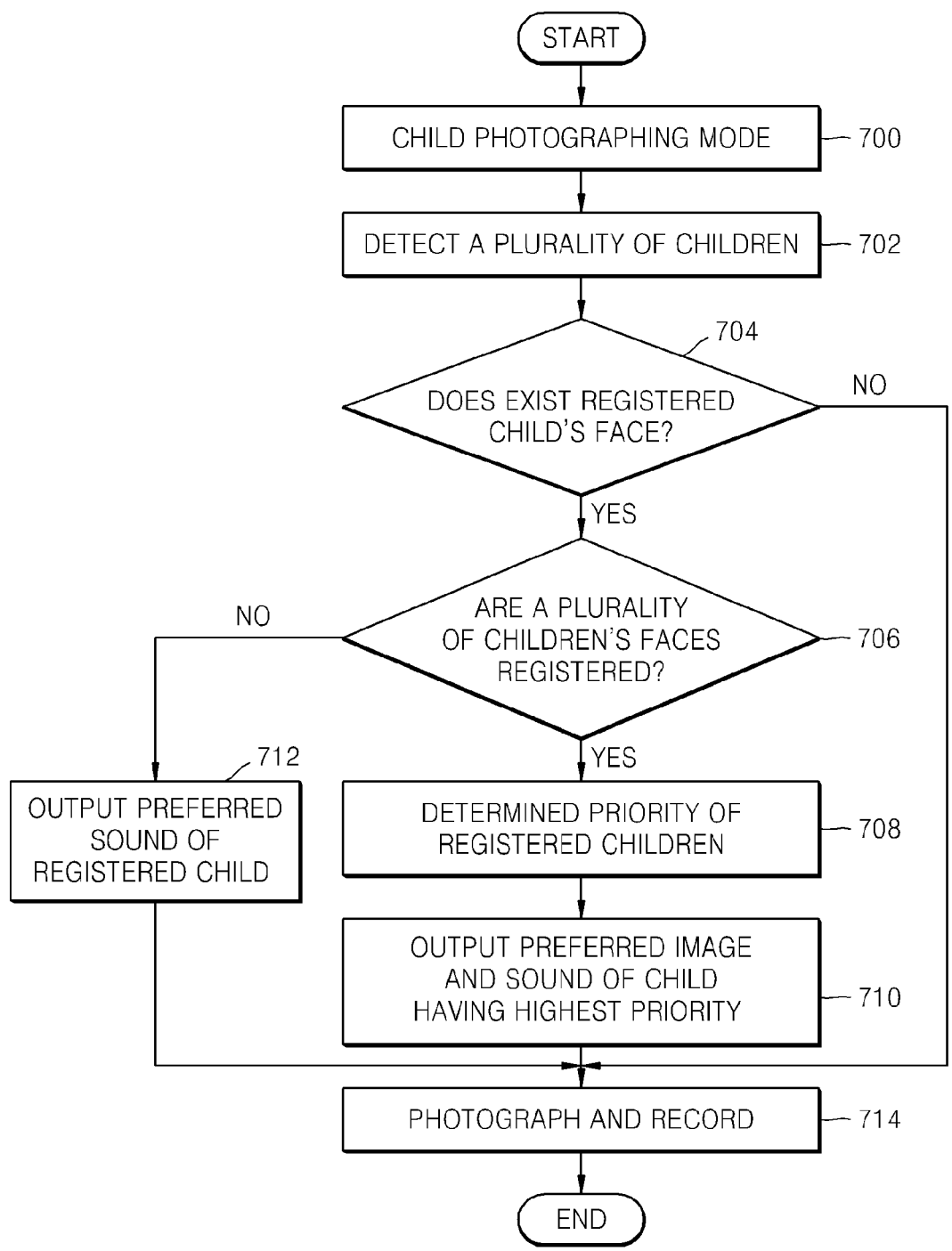
FIG. 7 is a flowchart of a method of controlling a digital photographing apparatus, according to another embodiment.

FIG. 7 is a flowchart of a method of controlling a digital photographing apparatus, according to another embodiment.

Referring to FIG. 7, in operation 700, the child-photographing mode is selected. In operation 702, a plurality of children's faces are detected. In operation 704, it is determined whether any of the detected children's faces are among registered children's faces. When any of the detected children's faces are among the registered children's faces, it is determined whether a plurality of the detected children's faces are among the registered children's faces, in operation 706. When only a single detected child's face is among the registered children's faces, the method proceeds to operation 712, in which a preferred image and sound of the registered detected child are output. In operation 714, an image is captured and recorded.

In operation 706, when a plurality of the detected children's faces are among the registered children's faces, priorities of the registered children's faces are determined, in operation 708. In operation 710, a preferred image and sound of a registered detected child having the highest priority are output. Thereafter, in operation 714, an image is captured and recorded.

Figure 8A:
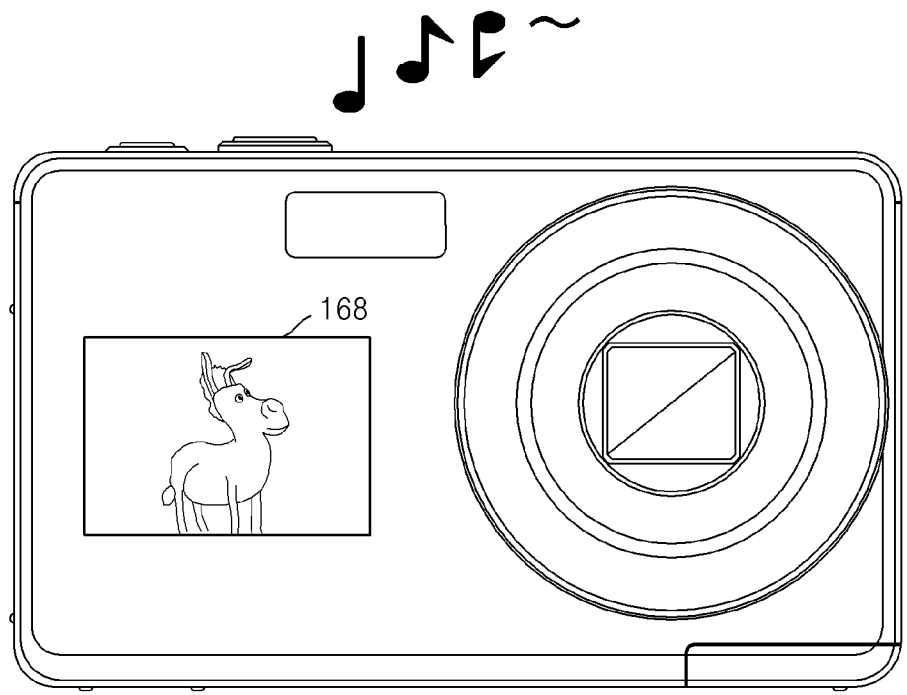
FIGS. 8A and 8B illustrate various examples, according to embodiments.
Figure 8B:
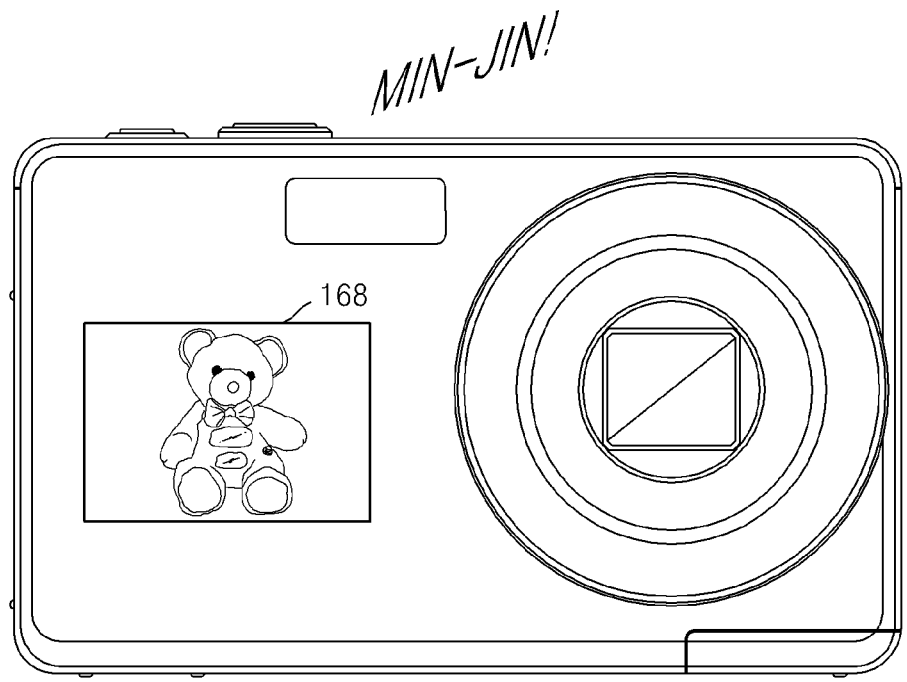

FIGS. 8A and 8B illustrate various examples, according to embodiments.

Referring to FIG. 8A, a preferred image of a child 'A' is displayed on the second display unit 168 or a front display unit, and a preferred sound of the child 'A' is output. Referring to FIG. 8B, a preferred image of a child 'B' is displayed on the second display unit 168, and a preferred sound of the child 'B' is output.

According to the one or more embodiments, children's faces are registered in a digital photographing apparatus, and preferred images and sounds of the children are output, thereby attracting the children's interest. In addition, adults who are nervous during photographing as well as children may relax and be comfortable, and thus photographing may be smoothly performed. Various facial expressions may be photographed by using various images displayed on a front display unit and various sounds.

Although a digital photographing apparatus which may embody the invention as defined by the following claims has been described above, this should not be construed as limiting. It is to be understood by one of ordinary skill in the art that a camera phone having a camera function, a personal digital assistant (PDA), or a portable multimedia player (PMP) may also be used.

According to the one or more embodiments, when children are photographed, an inattentive child's interest may be attracted to a camera and thus the child may be photographed while the child is focusing on images displayed on the camera.

In addition, people who are nervous during photographing may relax and be comfortable, and thus various face expressions may be photographed.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling a digital photographing apparatus comprising a first display unit and a second display unit, the method comprising:
   detecting a subject that was previously registered, in an input image; and
   displaying a registered preferred image on the second display unit included in a front surface of the digital photographing apparatus,
   wherein the registered preferred image is associated with the detected subject, and comprises registering a priority of the predetermined subject,
   wherein when a plurality of subjects that are previously registered are detected in the input image, determining priorities of the plurality of subjects,
   wherein the displaying comprises displaying the registered preferred image on the second display unit included in the front surface of the digital photographing apparatus according to information of the detected subject having a highest priority.

2. The method of claim 1, further comprising outputting a registered preferred sound through a speaker of the digital photographing apparatus according to the information of the detected subject.

3. The method of claim 2, further comprising registering a predetermined subject, and a preferred image and a preferred sound of the predetermined subject.

4. The method of claim 1, further comprising:
   detecting a subject in the input image; and
   recognizing whether the detected subject is a registered subject.

5. The method of claim 4, wherein the displaying comprises, when the detected subject is not the registered subject, an image that is previously set is displayed on the second display unit.

6. The method of claim 1, wherein the subject is a child's face.

7. A non-transitory computer readable storage medium having stored thereon a program executable by a processor for performing a method of controlling a digital photographing apparatus comprising a first display unit and a second display unit, the method comprising:
   detecting a subject that was previously registered, in an input image; and
   displaying a registered preferred image on the second display unit included in a front surface of the digital photographing apparatus,
   wherein the registered preferred image is associated with the detected subject, and comprises registering a priority of the predetermined subject,
   wherein when a plurality of subjects that are previously registered are detected in the input image, determining priorities of the plurality of subjects,
   wherein the displaying comprises displaying the registered preferred image on the second display unit included in the front surface of the digital photographing apparatus according to information of the detected subject a having highest priority.

8. A digital photographing apparatus comprising:
   a first display unit;
   a second display unit included in a front surface of the digital photographing apparatus;
   a subject recognizing unit that detects a subject that is previously registered, in an input image; and a control unit that displays a registered preferred image on the second display unit, wherein the registered preferred image is associated with the detected subject, and wherein the control unit, when a plurality of subjects that are previously registered are detected in the input image, determines priorities of the plurality of subjects, and displays the registered preferred image on the second display unit included in the front surface of the digital photographing apparatus according to information of the detected subject having a highest priority.

9. The digital photographing apparatus of claim 8, wherein the control unit outputs a registered preferred sound through a speaker of the digital photographing apparatus according to the information of the detected subject.

10. The digital photographing apparatus of claim 9, further comprising a subject registering unit that registers a predetermined subject, and a preferred image and a preferred sound of the predetermined subject.

11. The digital photographing apparatus of claim 9, further comprising a subject detecting unit that detects a subject in the input image, wherein the subject recognizing unit recognizes whether the detected subject is a registered subject.

12. The digital photographing apparatus of claim 11, wherein, when the detected subject is not the registered subject, the control unit displays an image that is previously set on the second display unit.

13. The digital photographing apparatus of claim 9, wherein the subject is a child's face.

* * * * *